United States Patent [19]

Jen

[11] Patent Number: 4,656,879

[45] Date of Patent: Apr. 14, 1987

[54] PUMP LEVER FOR A JACK

[75] Inventor: You Y. Jen, Taipei, Taiwan

[73] Assignee: Yann Tay Enterprises Co., Ltd., Taiwan

[21] Appl. No.: 631,596

[22] Filed: Jul. 17, 1984

[51] Int. Cl.[4] ........................ F16H 21/44; G05G 1/04

[52] U.S. Cl. ........................................ 74/102; 74/526; 254/93 H

[58] Field of Search ................. 74/102, 104, 523, 526, 74/543, 544; 248/514; 254/93 H, 93 R, DIG. 1, DIG. 3; 403/116, 117

[56] References Cited

U.S. PATENT DOCUMENTS

| | | | |
|---|---|---|---|
| 670,416 | 3/1901 | Cronk | 74/523 |
| 1,672,220 | 6/1928 | Hughes | 74/523 |
| 2,070,935 | 2/1937 | Traut | 254/93 H |
| 2,465,653 | 3/1949 | Leterman | 254/93 H |
| 2,527,428 | 10/1950 | Kemerer | 254/93 H |
| 2,550,163 | 4/1951 | Phenning | 254/93 H |
| 2,667,317 | 1/1954 | Trebules | 248/514 |
| 2,721,631 | 10/1955 | Honold | 248/514 |
| 2,974,490 | 3/1961 | Hott | 254/93 H |
| 3,822,966 | 7/1974 | McClocklin | 254/93 H |
| 4,445,554 | 5/1984 | Suzuki | 254/93 H |

FOREIGN PATENT DOCUMENTS

| | | | |
|---|---|---|---|
| 499001 | 11/1950 | Belgium | 403/116 |
| 1037991 | 9/1958 | Fed. Rep. of Germany | 254/93 H |

*Primary Examiner*—Lawrence Staab
*Attorney, Agent, or Firm*—McGlew & Tuttle

[57] ABSTRACT

A pump lever for a jack includes a handle sleeve adapted to receive a handle and be connected to a piston of a fluid pump for the jack and a limiting piece secured to a base on the jack and for guiding the handle sleeve to be raised and lowered and confining a safe range within which the handle sleeve can be raised and lowered without damaging the piston.

5 Claims, 9 Drawing Figures

PUMP LEVER FOR A JACK

BACKGROUND OF THE INVENTION

The present invention relates to a jack, and more particularly to a pump lever for a jack.

In FIG. 1, there is shown a floor jack which, in appearance, broadly includes a handle sleeve A having a handle receiving hole A1, a lifting arm B, a reinforcing shaft C, a left frame D, a right frame D and a piston P of a hydraulic pump for the jack. It is necessary that one must laboriously squat on the ground to hold the handle in the handle receiving hole A1 up and down about 30–50 times to raise the saddle to the lifting arm B to its top position. In addition, it can be realized that the one usually applies force in not only raising but also lowering the handle. Furthermore, since the range within which the handle sleeve A can be raised is not limited it is quite possible that the handle is raised so high as to damage the piston P. Besides, it also can be found that during holding up and down the handle the handle sleeve A is not always raised and lowered accurately along the axis of the piston P which is, thus, susceptible to damage. It is therefore attempted by the applicant to deal with the situations which happen to the prior art.

SUMMARY OF THE INVENTION

It is therefore an object of the present invention to provide a pump lever for a jack which can limit the range within which a handle sleeve of the jack can be raised and lowered without damaging a piston of a fluid pump for the jack.

It is therefore another object of the present invention to provide a pump lever for a jack which automatically urges the handle sleeve upwardly to its top position when one frees it in a lowered position.

It is further an object of the present invention to provide a pump lever for a jack which permits the handle sleeve to be accurately raised and lowered along the axis of the piston.

It is yet an object of the present invention to provide a pump lever for a jack which allows a saddle on a lifting arm of the jack to be raised with one's one foot.

According to the present invention, the pump lever for a jack includes a handle sleeve adapted to receive a handle and be connected to a piston of a fluid pump for the jack and a limiting piece secured to a base on the jack and for guiding the handle sleeve to be raised and lowered and confining a safe range within which the handle sleeve can be raised and lowered without damaging the piston. Preferably the pump lever further includes an elastic member mounted between the handle sleeve and the limiting piece so that the elastic member will urge the handle sleeve upwardly to a raised position when one frees the handle the top end of which is in the handle sleeve in a lowered position.

The limiting piece may have a U cross section, a bottom wall and two first side plates each of which has a first hole at its front end and a curve groove at its rear end. The handle sleeve may have a corresponding portion of inverted U cross section which is capable of being guidedly received in the limiting piece of U cross section and has a top wall and two section side plates each of which has a second hole at its front end and a third hole at its rear end. A first pin is pinned through all of the first and second holes and a second pin is pinned through all of the curve grooves and the third holes and has its two ends respectively retained in the curve grooves Alternatively, the limiting piece may have a front plate and two parallel third side plates each of which has a sixth hole. The handle sleeve may have a portion of inverted U cross section capable of being guidedly received between the two parallel third side plates, a top front end and two fourth side plates each of which has a seventh hole. A fourth pin is pinned through all of the sixth and seventh holes so that the handle sleeve cannot be raised further when the top front end contacts with the front plate.

In simplicity, the elastic member may be a wire spring having an eyelet for passing the first or fourth pin, a first end urging upon the top wall and a second end urging upon the bottom wall on the base.

Preferably each of the two first side plates has a fourth hole provided between its the first hole and curve groove, each of the two second side plates has a fifth hole provided between its second and third holes and a third pin is capable of pinning through all of the fourth and fifth holes to fix the handle sleeve in the limiting piece.

The present invention may best be understood with reference to the accompanying drawings, in which:

DETAILED DESCRIPTION OF THE PREFERRED EMBODIMENT

Figure 1A:
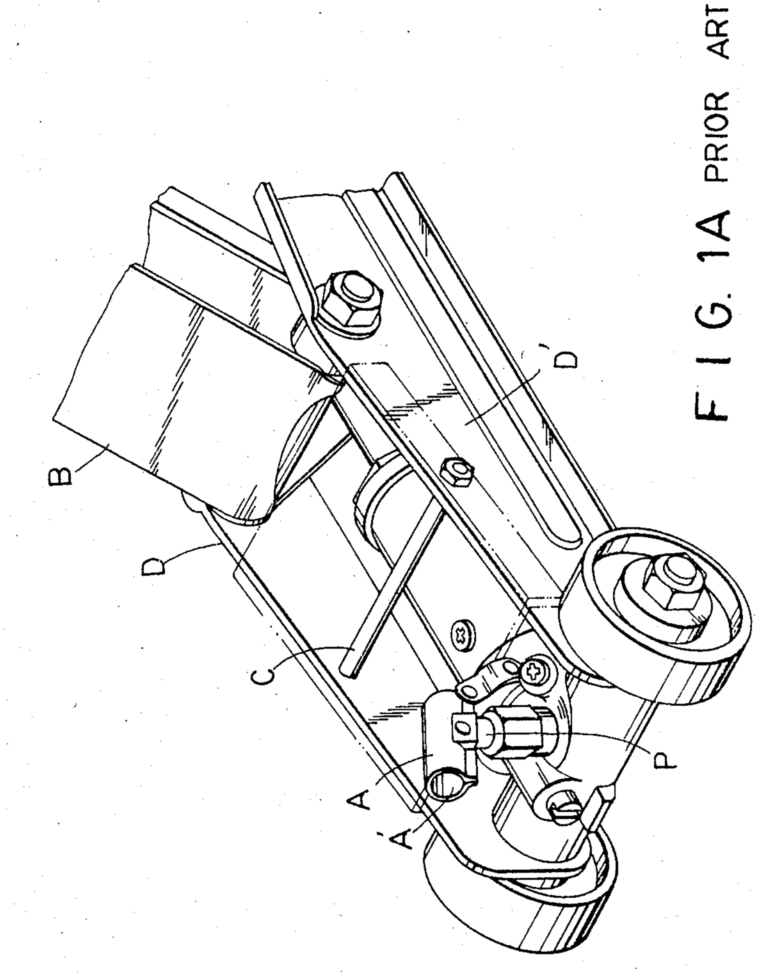
FIG. 1A PRIOR ART
FIG. 1A is a partially perspective view showing the broad appearance of a known floor jack.
Figure 1B:
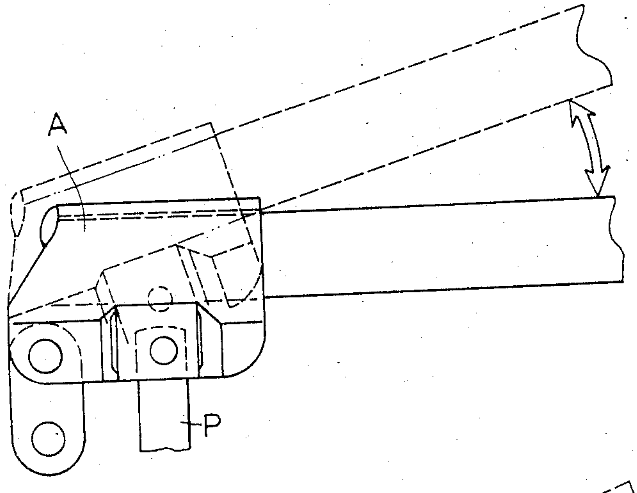
F I G. 1B PRIOR ART
FIG. 1B is a schematic view showing a pump lever of the prior jack.
Figure 1C:
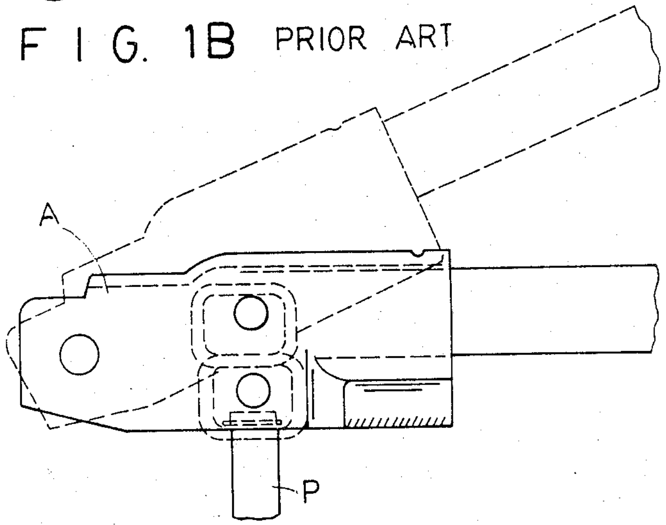
F I G. 1C PRIOR ART
FIG. 1C is a schematic view showing another pump lever of the prior jack.
Figure 2:
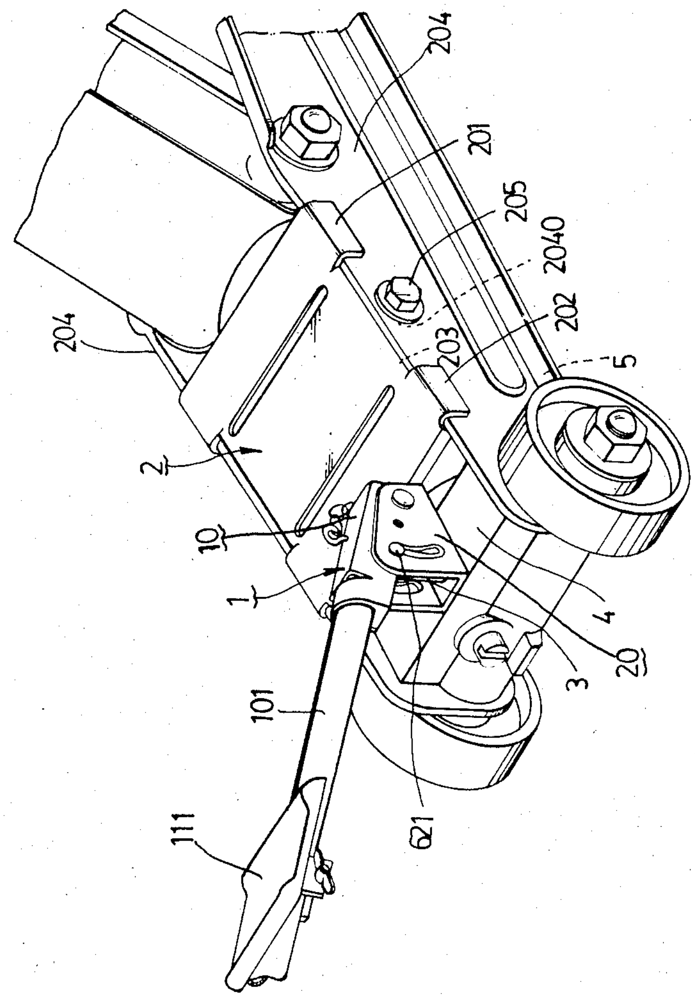
FIG. 2 is a partially perspective view showing the broad appearance of a jack incorporating a preferred embodiment of a pump lever of the present invention.

Referring now to FIG. 2, there is shown a perspective view showing a floor jack incorporating a pump lever 1 and a reinforcing plate 2 of the present invention. Pump lever 1 includes a handle sleeve 10 adapted to receive a handle 101, the rear end of which can be secured to a plate 111 for being force-applied thereon by a foot, and be connected to a piston 3 of a fluid pump for the jack, a limiting piece 20 secured to a base 4 on the jack and for guiding handle sleeve 10 to be raised and lowered therein and confining a safe range within which handle sleeve 10 can be raised and lowered without damaging piston 3 and an elastic member 5 which is mounted between handle sleeve 10 and limiting piece 20 so that elastic member 5 will urge handle sleeve 10 upwardly to a raised position when one frees handle 101 in a lowered position.

Figure 2A:
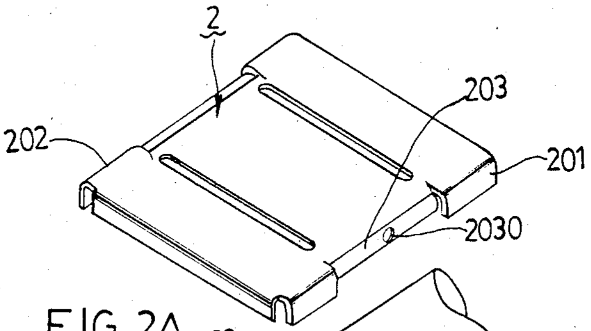
FIG. 2A is a perspective view showing a reinforcing plate for a jack.

In FIG. 2A, there is shown a perspective view of reinforcing plate 2 which can successfully replace the reinforcing shaft together with a cover on the two side frames of a jack and each side of which has two downturned side flanges 201, 202 and a downturned central flange 203 in a way to respectively engage with the exterior and interior surfaces of each of the two side frames 204 of the jack and central flange 203 has a threaded hole 2030 which, through a hole 2040 on side frame 204, a bolt 205 can securely engage therein.

Figure 4A:
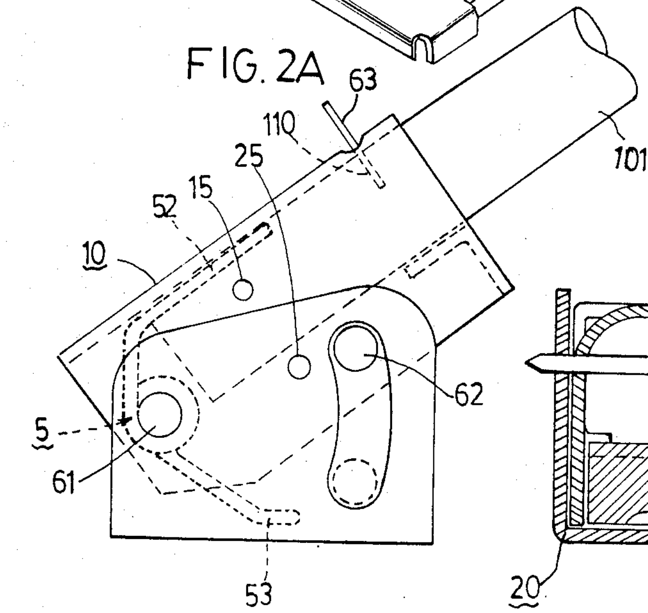
FIG. 4A is a section view of a pump lever of the present invention.
Figure 4B:
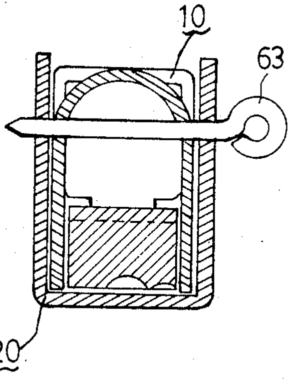
FIG. 4B is a section view showing a third pin pinning through all of the fourth and fifth holes respectively on the side plates of a limiting piece and a handle sleeve of a pump lever of the present invention.
Figure 3:
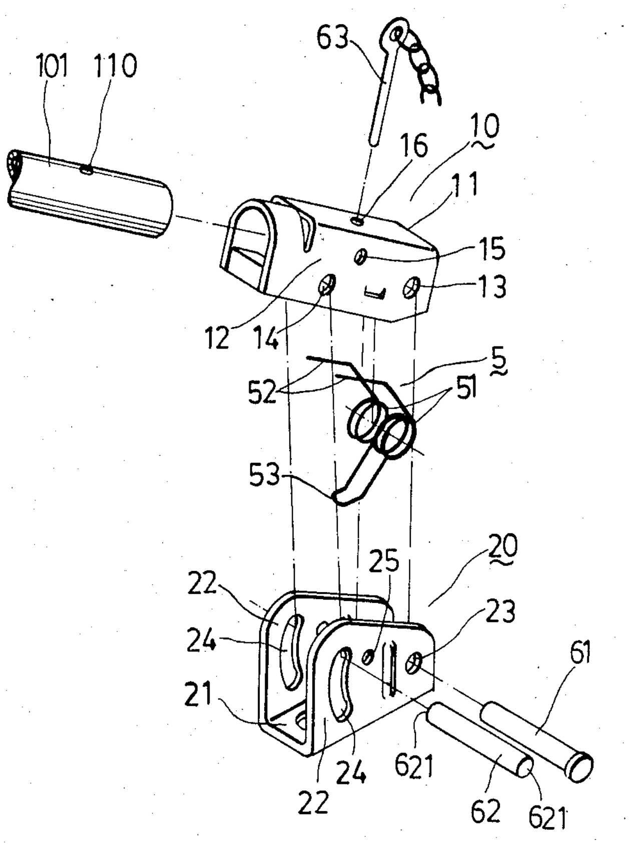
FIG. 3 is an exploded view of a pump lever of the present invention.

In FIG. 3, there is shown an exploded view of a pump lever 1 of the present invention. Limiting piece 20 has a U cross section, a bottom wall 21 and two side plates 22 each of which has a first hole 23 at its front end and a curve groove 24 at its rear end. Handle sleeve 10 has a corresponding portion of inverted U cross section which is capable of being guidedly received in limiting piece 20 and has a top wall 11 and two side plates 12 each of which has a second hole 13 at its front end and a third hole 14 at its rear end. Elastic member can be a wire spring having two eyelets 51, a first end 52 urging upon the interior surface of top wall 11 and a second end 53 urging upon bottom wall 21. A first pin 61 pins through all of first holes 23, eyelets 51 and second holes 13. A second pin 62 pins through all of curve grooves 24 and third holes 14 and leaves its two ends 621 respectively retained in curve grooves 24. Each of side plates 22 has a fourth hole 25 and each of side plates 12 has a fifth hole 15. A third pin 63 is capable of pinning through all of fourth and fifth holes 25, 15 to fix handle sleeve 10 in limiting piece 20 as better shown in FIG. 4B. Through a hole 16 on top wall 11 third pin 63 can pin into a hole 110 on handle 101 for better securing handle 101 in handle sleeve 10 as better shown in FIG. 4A.

Figure 5:
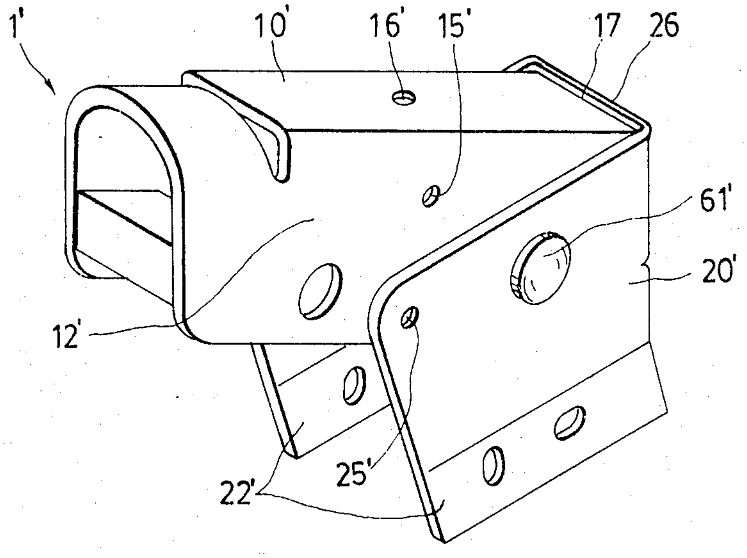
FIG. 5 is a perspective view showing another preferred embodiment of a pump lever of the present invention.

In FIG. 5, there is shown a perspective view of further an embodiment of a pump lever 1' of the present invention. Limiting piece 20' has a front plate 26 and two parallel side plates 22' each of which has a sixth hole. Handle sleeve 10' has a portion of inverted U cross section capable of being guidedly received between side plates 22', a top front end 17 and two side plates 12' each of which has a seventh hole. A fourth pin 61' is capable of pinning through all of the sixth and seventh holes so that handle sleeve 10' can not be raised further when top front end 17 contacts with front plate 26.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What I claim is:

1. A pump lever for a jack comprising: a handle sleeve adapted to receive a handle and be connected to a piston of a fluid pump for said jack; a limiting piece secured to a base on said jack and for guiding said handle sleeve to be raised and lowered and confining a safe range within which said handle sleeve can be raised and lowered without damaging said piston; and an elastic member mounted between said handle sleeve and said limiting piece so that said elastic member will urge said handle sleeve upwardly to a raised position when one frees said handle the top end of which is in said handle sleeve in a lowered position; said limiting piece having a U cross-section, a bottom wall and two first side plates each of which has a first hole at its front end and a curve groove at its rear end; said handle sleeve having a corresponding portion of inverted U cross-section which is capable of being guidedly received in said limiting piece of U cross-section and has a top wall and two second side plates each of which has a second hole at its front end and a third hole at its rear end and; said pump lever further including a first pin pinned through all of said first and second holes; and a second pin pinned through all of said curve grooves and said third holes and having its two ends respectively retained in said curve grooves, said elastic member being a wire spring having an eyelet for passing said first pin, a first end urging upon said top wall and a second end urging upon said bottom wall, each of said two first side plates having a fourth hole provided between its said first hole and curve groove; and each of said two second side plates has a fifth hole provided between its second and third holes and said pump lever further includes a third pin capable of pinning through all of said fourth and fifth holes to fix said handle sleeve in said limiting piece.

2. A pump lever for a jack according to claim 1, including a handle inserted into said handle sleeve, said top wall of said handle sleeve having a hole therein and said handle having a hole therein aligned with said top wall hole of said handle sleeve with said handle in said handle sleeve, said third pin being insertable through said top wall hole and said handle hole for holding said handle to said handle sleeve.

3. A pump lever for a jack according to claim 2, wherein said jack comprises spaced-apart side frames, a foot plate fixed to said handle at a location spaced from said handle sleeve, and a reinforcing plate connected between the side frames of said jack.

4. A pump lever for a jack according to claim 3, wherein said reinforcing plate has a pair of exterior flanges at each end thereof, each engaged on outside surfaces of a respective side plate and an interior flange at each end of said reinforcing plate between said exterior flanges at each end for engagement on the inside of each side frame, said interior flange having holes therethrough and said side frames having holes therethrough, and at least one bolt extending through said holes of said side frames and interior flanges for connecting said reinforcing plate to said jack.

5. A pump lever for a jack according to claim 4, including a base connected between said side frames and carrying the piston of the fluid pump for said jack, said bottom wall of said limiting piece being connected to said base.

* * * * *